March 23, 1954 D. H. HESTER 2,673,013
DEVICE FOR DISPENSING PREDETERMINED
AMOUNTS OF LIQUID FROM CONTAINERS
Filed Dec. 27, 1949 3 Sheets-Sheet 2
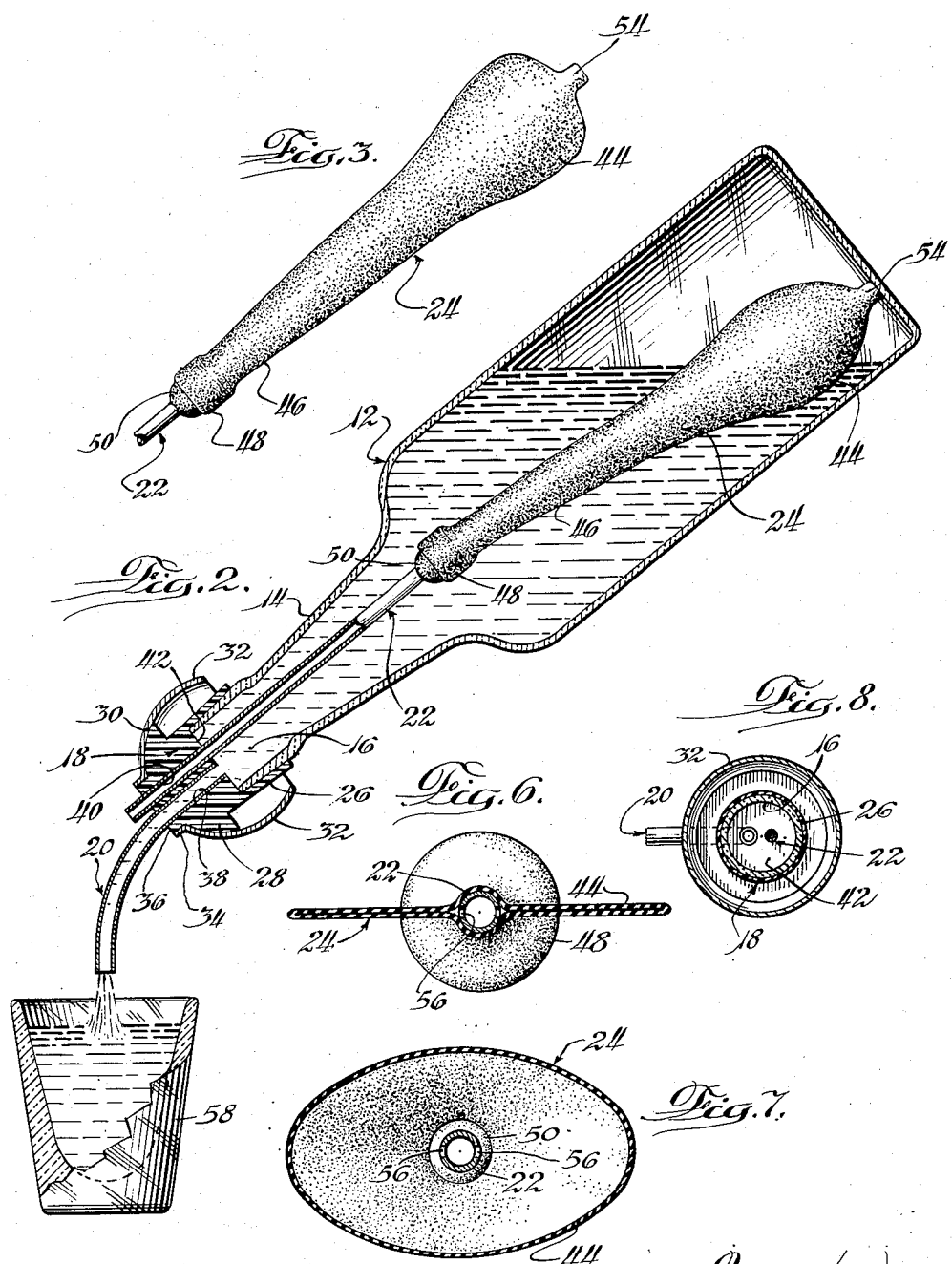

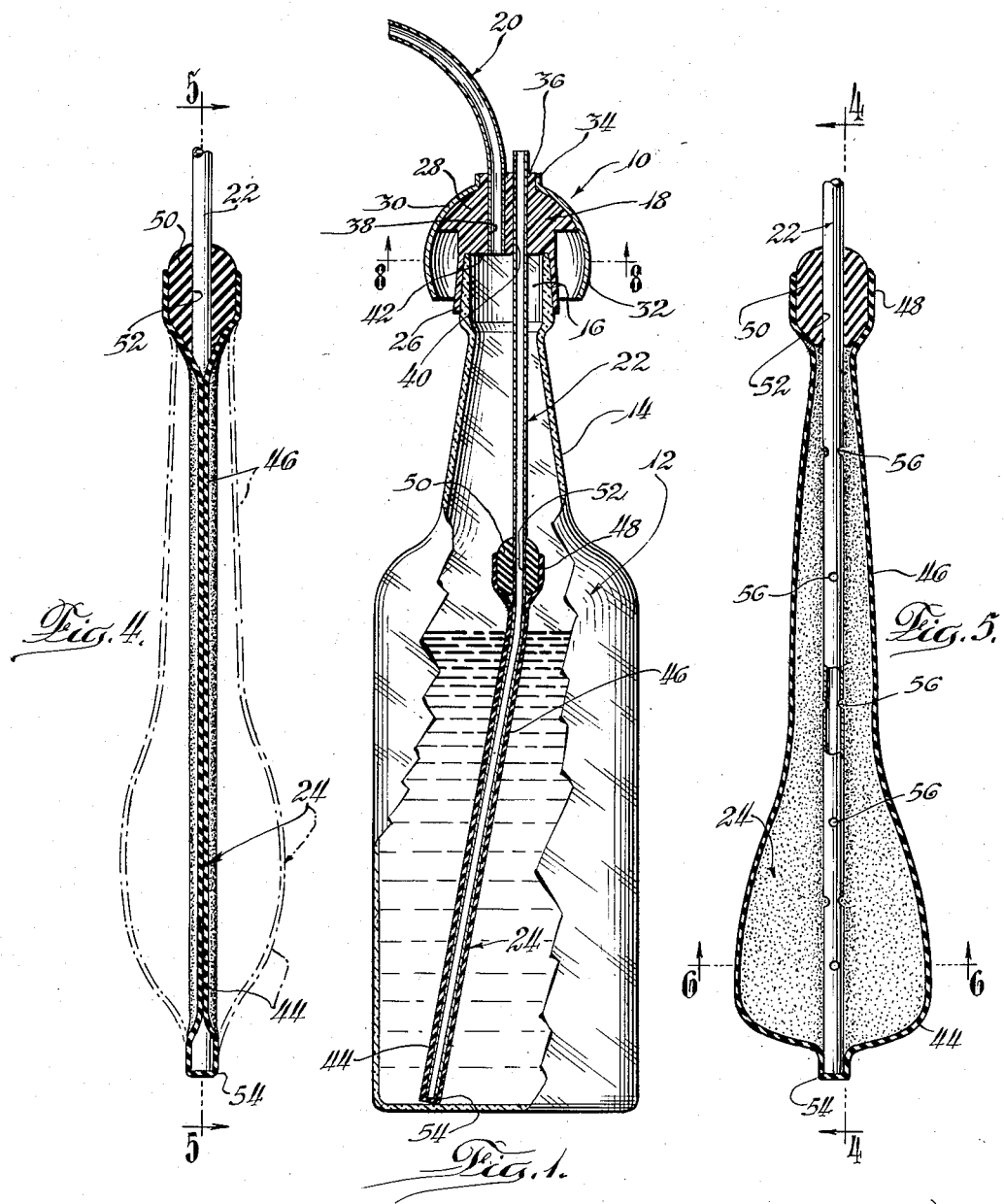

March 23, 1954  D. H. HESTER  2,673,013
DEVICE FOR DISPENSING PREDETERMINED
AMOUNTS OF LIQUID FROM CONTAINERS
Filed Dec. 27, 1949  3 Sheets-Sheet 3
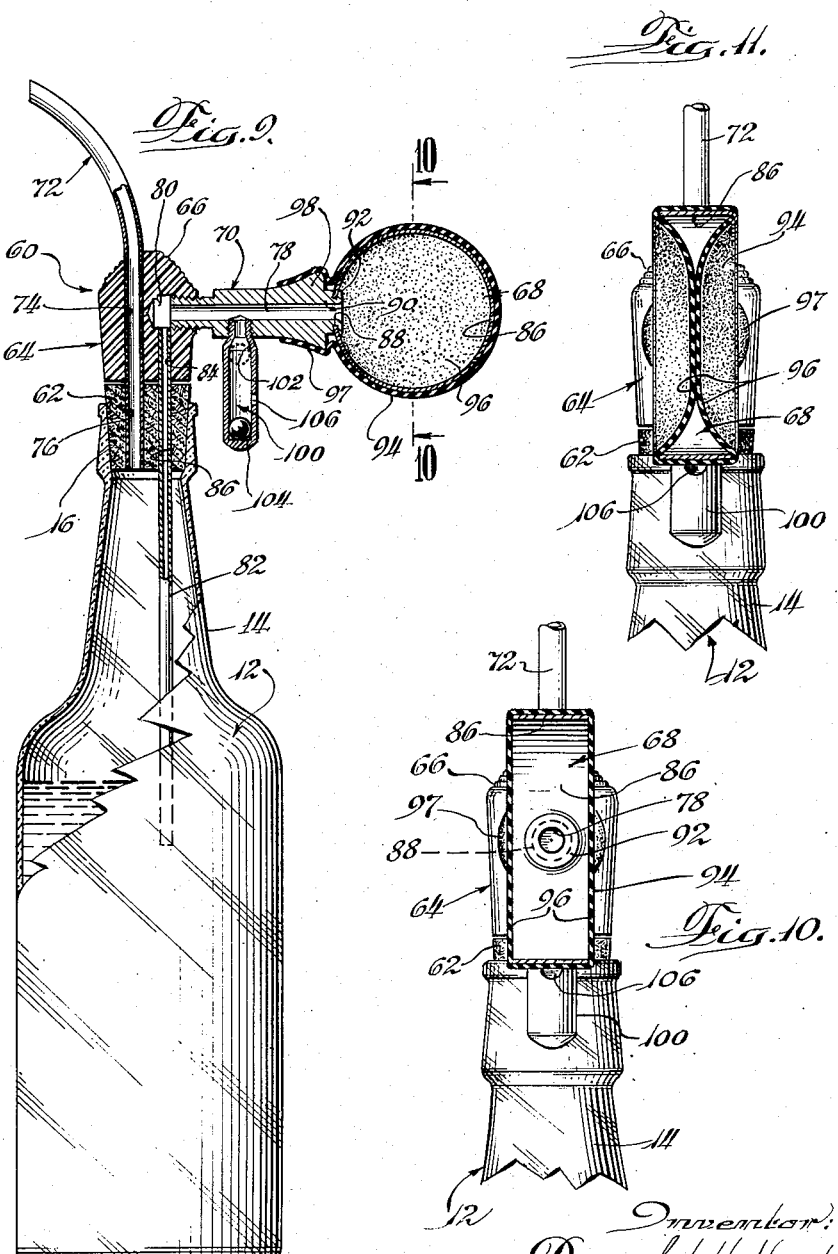

Patented Mar. 23, 1954

2,673,013

UNITED STATES PATENT OFFICE 2,673,013

DEVICE FOR DISPENSING PREDETERMINED AMOUNTS OF LIQUID FROM CONTAINERS

Dwight H. Hester, Chicago, Ill.

Application December 27, 1949, Serial No. 135,266

16 Claims. (Cl. 222—386.5)

My invention relates to liquid dispensers and in particular to a novel dispenser adapted for use in dispensing liquids from conventional bottles in predetermined measured amounts.

It has been proposed in the past to provide liquid dispensers for use in dispensing alcoholic liquors in measured amounts from the bottles in which the liquors are sold. Most of these prior dispensers possess the disadvantage that they are not easily used. Some of them require adjustments to be made in the dispenser as the bottle is emptied. Others require the user to change his natural pouring motions in order to fill a measuring compartment which forms a part of the dispenser before pouring the liquor into a glass. Many, if not most of these prior dispensers have the further disadvantage that they are somewhat complicated in their construction and, therefore, expensive. Some include valves or other moving parts which must be cleaned from time to time, thereby necessitating disassembling the dispenser. All of these objections to the prior art dispensers have been overcome in the dispenser forming the subject matter of my invention.

It is, therefore, a principal object of my invention to provide a novel liquid dispenser of the measuring type which is simple in construction, inexpensive to manufacture, easy to use and accurate in measuring the amounts poured from a bottle or other container.

Another object is to provide a novel liquid dispenser which is positive in its action, utilizing the volumetric displacement by air of the liquid poured from the container to control its operation.

Another object is to provide a novel liquid dispenser of the measuring type adapted to fit bottles of various shapes and sizes.

Another object is to provide a novel liquid dispenser of the measuring type needing no adjustments as the container is emptied.

A further object is to provide a novel liquid dispenser of the measuring type which when in use allows the user to pour liquid from the container with his customary manual actions.

And still a further object is to provide a novel liquid dispenser which is very easy to clean.

Other objects and advantages will become apparent from the following description taken in conjunction with the accompanying drawings wherein:

Fig. 1 is a medial sectional view, with some parts in elevation, of a conventional alcoholic liquor bottle fitted with my novel dispenser;

Fig. 2 is a view similar to Fig. 1 illustrating the method of using the dispenser in pouring liquor from the bottle into a glass;

Fig. 3 is an elevational view of the air compartment sack rotated 90° from the position shown in Fig. 2;

Fig. 4 is a sectional view on an enlarged scale of the sack portion of the dispenser and may be considered as taken along the line 4—4 of Fig. 5, looking in the direction of the arrows, and showing the sack in its inflated position in phantom lines;

Fig. 5 is a cross-sectional view taken substantially along the line 5—5 of Fig. 4 but showing the breather tube in elevation;

Fig. 6 is a cross-sectional view on an enlarged scale and may be considered as taken substantially along the line 6—6 of Fig. 5, looking in the direction of the arrows;

Fig. 7 is a view similar to Fig. 6 illustrating the sack in its inflated condition;

Fig. 8 is a cross-sectional view taken substantially along the line 8—8 of Fig. 1, looking in the direction of the arrows;

Fig. 9 is a medial cross-sectional view with some parts in partial elevation of a modified form of dispenser;

Fig. 10 is a cross-sectional view taken substantially along the line 10—10 of Fig. 9, looking in the direction of the arrows; and Fig. 11 is a view similar to Fig. 10 illustrating the position of the walls of the air compartment at the end of a pouring operation and before the bottle has been restored to upright position.

While my novel dispenser has been illustrated in connection with dispensing alcoholic liquors from conventional bottles, it is to be understood that this dispenser has a wider application and is usable with various types of containers when it is desired to pour measured quantities of liquid from the container into another receptacle.

Referring first to the principal form of the invention illustrated in Figs. 1 to 8, it will be seen that my novel dispenser indicated generally by the reference character 10 is applied to a conventional liquor bottle 12 provided with a throat of tapering reduced cross-sectional area 14 and an outlet 16 which is originally sealed by a cork or other conventional form of closure.

The dispenser 10 comprises four main parts, namely a cap or closure portion 18, a pouring tube 20, a breather tube 22, and a flexible liquid impervious measuring chamber and air compartment forming sack or bag 24 which encloses the lower end of the breather tube and is sealed thereagainst.

The closure member 18 is shown as molded of a plastic material, and I have found that a plastic such as polyethylene is suitable, although it is to be understood that the closure member 18 may be formed of natural or synthetic rubber or any other suitable material. It may even possess a shape different from that which I have illustrated, it merely being essential that the member 18 seal the opening 16 of the bottle. The closure member 18 has a depending skirt 26 of tubular cross section (Fig. 8) firmly to hold and seal against the outer surface of the bottle around the outlet 16. The main portion 28 of the closure 18 is preferably solid and has a spherical outer surface 30 so as to cooperate with a decorative parti-spherical shell 32. The shell 32 may have a highly polished chromium plated finish or may provide space for advertising material. At its upper end the shell 32 has a short tubular flange 34 which is seated against a round boss 36 on the member 18 so as accurately to locate the shell with respect to the closure member.

The closure member is formed with a pair of openings 38 and 40 which are parallel to its axis and to the axis of the bottle 12. The curved pouring spout is fitted into the opening 38 so that its lower and inner end is preferably flush with face 42 of the closure member 18, the face 42 seating against the upper edge of the bottle. The breather tube 22 passes through the opening 40. Both openings 38 and 40 are preferably formed slightly undersize so that the tubes 20 and 22 form an airtight seal with the closure member 18. The tubes should be rotatable and slidable in the openings 38 and 40 upon the application of a little pressure in order that the pouring spout 20 can be adjusted to the proper pouring angle and the tube 22 can be moved axially of the bottle to position its lower end at or close to the bottom of the bottle (Fig. 1).

The shape of the air compartment forming sack 24 is best seen in Figs. 2 to 5 where it will be observed that it is generally pear-shaped, having a lower enlarged end 44 gradually tapering upwardly through a portion of restricted cross section 46 toward the upper end 48. The upper end of the sack 48 is permanently secured by a suitable adhesive to a plug 50 formed with a fairly regular outer shape and an axial bore 52 through which the tube 22 extends. The plug 50 may be formed of rubber or other moldable material and the inner diameter of the bore 52 is preferably slightly less than the outer diameter of the tube 22 so that the plug 50 will make an airtight seal with the tube 22. It is of course understood that the plug 50 might also be permanently secured to the tube 22 by a suitable adhesive or other sealing compound.

At the center of its lower end the sack 24 is formed with a shallow cylindrical projection 54 to receive the lower end of the tube 22 thereby accurately to locate the sack 24 relative to the tube.

The lower approximately one-half of the tube 22, i. e., that part of the tube enclosed within the sack 24, has a plurality of small holes or openings 56 providing free communication between the bore of the tube 22 and the air compartment in the sack 24. The tube 22 is preferably made of a readily bendable material such as copper or a copper alloy so that the bulbous portion 44 of the sack 22 may be positioned at any place within the bottle 12 with respect to the axis of the bottle.

The sack 24 is preferably made of rubber of such weight and characteristics that it is not stretchable although being perfectly flexible. A sack which I have found to be satisfactory is made from natural rubber either with or without a coloring pigment by a dipping process until the thickness of the rubber is .017 inch. This material and the thickness provides a sack which is adequately flexible and nonstretchable under ordinary usage conditions and which of course is not attacked by the alcohol or other ingredients of the liquor. Of course, other materials may be used, such as a pliable plastic material or an impregnated woven material, having such characteristics that the material is flexible, nonstretchable and impervious to liquids.

The sack 24 is so formed that in its relaxed position its two sides or faces lie flat against each other and, therefore, enclose substantially no air. This same condition obtains when the breather tube 22 is inserted and the sack is in its upright position as shown in Fig. 1. Of course, when the dispenser is placed on a bottle or container full of liquid the sack 24 is wholly immersed and the weight of the liquid presses its sides together and expels any small amount of air that may have been in the sack. This flattened position is shown in Fig. 6.

This dispenser may be made easily and inexpensively, having few parts. The sack is preferably made of rubber material, and I have found that the conventional dipping process is an inexpensive and effective method of manufacture. When, as is preferred, the closure member 18 is made of a plastic, such as polyethylene, it may be molded. However, the method of manufacturing the individual parts of the dispenser will depend in a large measure upon the materials selected for those parts.

The first step in a preferred form of manufacture is to insert the sealing plug 50 in the upper end 48 of the sack 24 and to seal them together with a suitable adhesive. The perforated end of the tube may then be inserted through the plug opening 52 so that its lower end extends into and seats in the hollow cylindrical projection 54. The plug 50 is slid upwardly on the tube 22 so that the sack is drawn firmly over the lower perforated end and all of the holes 56 communicate with the interior of the sack. In this position, as will be observed from Figs. 4 and 6, the sack is flat or substantially so and closely encompasses the tube 22. The pouring spout 20 is inserted into the opening 38 in the closure member 18 and the upper end of the tube 22 is pushed through the opening 40. As has been previously stated, it is preferred that the openings 38 and 40 be slightly undersize so that the tubes will make an airtight seal with the closure member. The decorative shell 32 is positioned on the closure member 18, and the assembled dispenser is ready for use.

After a bottle of liquor has been opened the dispenser is placed on the bottle by inserting the sack 24 through the opening 16 and down into the bottle so that its lower end and the tube 22 contact the bottom of the bottle. In Fig. 1 I have shown the tube bent so that the bottom of the sack 24 and the tube 22 are offset to the same side of the axis of the bottle as is the pouring spout so that during a pouring operation the sack will be covered by the liquid as long as possible.

With the dispenser so mounted, the liquor is poured from the bottle to a glass 58 in the conventional manner. However, instead of the liquid poured from the bottle being displaced by air bubbling through a capillary or other tube, as in conventional pouring devices, the air enters through the tube 22 into the interior of the measuring chamber sack 24 which balloons as shown in Figs. 2, 3 and 7. The extent to which the sack 24 will balloon determines the amount of liquid which may be poured from the bottle because as soon as the air can no longer enter the measuring chamber, liquid will stop pouring from the spout 20 as its diameter will not permit counterflow of liquid and air. Thus the difference in the interior volume of the sack 24 between its collapsed condition (Figs. 4 and 6) and its ballooned condition (Figs. 2, 3 and 7) measures the amount of liquor or liquid which may be dispensed from the bottle. As soon as this measured amount has been dispensed the bottle is returned to its upright position. The natural form of the sack 24 and the weight of the liquid remaining in the bottle collapse the sack to its flattened condition, expelling the air from the measuring chamber through the tube 22 to the atmosphere. The air expelled from the sack is replaced in the bottle through the pouring spout 20 which is thus cleared of any trapped liquid drops or bubbles. This operation may be repeated as many times as is desired, and it has been found that an accurate and same measurement of liquor will be dispensed from the bottle during each pouring operation.

The pear shape for the sack 24 has been chosen advisedly. I have found by experimentation that if the air inlet to the bottle is closed off and an attempt made to pour liquor from a substantially full bottle almost no liquor flows from the bottle, that is, the small volume of air subjected to a partial vacuum by the weight of the liquid seeking to pour through the spout 20 allows only a very small amount of liquid to trickle from the bottle. However, as the bottle is emptied an increasing amount of liquor will be poured from the bottle even though not immediately replaced by air through the breather tube, because of the increasing volume of air which is trapped in the bottle.

It is difficult, if not impossible, to construct the sack 24 in such a manner that its two flat sides will lie in face to face relation around the tube 22 without enclosing any air. Consequently, a small amount of air will always be present in the sack. When the bottle is full and the sack is completely immersed, the volume of trapped air will be at a minimum as the liquid will press the sack sides together throughout its length. As the bottle is emptied the amount of trapped air will increase in the tapering neck portion 46 of the sack. This condition coupled with the previously mentioned phenomenon of liquor pouring from the bottle without entry of air thereinto compensate each other and ensures that a predetermined constant measure of liquor will always be dispensed.

It will thus be observed that I have invented a simple, inexpensive, accurate and self compensating dispenser which will pour a same and exact measure of liquid from a liquor bottle at each successive pouring operation. The cleaning of this dispenser is also exceedingly simple, it merely being necessary when the sack is withdrawn from the bottle to dip it in water or to run it under a flowing stream of tap water.

A modified form of liquid dispenser 60 is illustrated in Figs. 9 to 11 and is shown applied to a conventional liquor bottle 12. The dispenser 60 is mounted on the bottle by means of a stopper 62 which may either be made of cork, rubber or other suitable material. Mounted directly above the stopper 62 is a body 64 preferably molded from a plastic material such as a phenol formaldehyde resin or a vinyl chloride resin and which may be formed with a decorative outer surface and top 66. A measuring chamber 68 is mounted on the body 64 by means of a fitting 70, and a pouring spout 72 communicates with the interior of the bottle through the bores 74 and 76 in the body 64 and stopper 62, respectively.

The fitting 70 is provided with a horizontal passageway 78 communicating with a passageway 80 in the body 74. A capillary tube 82 mounted to project a substantial distance into the bottle 12 communicates with the passageway 80 and extends into a bore 84 in the body 64 and through a bore 86 in the stopper 62. It is preferred that the bores 74 and 76 and 84 and 86 be somewhat undersize so that the tubes 72 and 82 form an airtight seal therewith. The fitting 70 may have either a press or threaded fit with the bore so that an airtight seal is formed between the body 64 and the fitting 70.

The measuring chamber 68 is formed upon a circular frame 86 having a hole 88 therein adapted to fit onto a shouldered extension 90 of the fitting 70. The extension 90 is peened over at 92 to secure the frame rigidly to the fitting 70. The chamber 68 is completed by means of a rubber sack 94 having a pair of flat sides 96 interconnected by a rim which extends over and covers the frame 86. At its inner or left end (Fig. 9) the sack 94 is formed with a cylindrical extension 97 which is stretched to extend over and seal against the outer face of the fitting 70. At this point the fitting 70 flares outwardly at 98 so that adjacent the frame 86 it has a greater outer diameter than it possesses closer to the body 64. This flaring shape ensures an adequate airtight seal between the sack 94 and the fitting 70. While the sack and the fitting may be sealed with an adhesive, the illustrated construction may be used without such a joint inasmuch as the vacuum imposed upon this chamber is not high and, therefore, it is not to be expected that any air leak will develop.

A tubular valve chamber 100 is threaded into the fitting 70 between the body 64 and the measuring chamber 68 so that the interior thereof connects with the passageway 78. At its upper end the valve chamber has a valve seat 102, and a ball valve member 104 moves therein. A port 106 communicates the interior of the valve chamber 100 with the atmosphere. The port 106 is located approximately midway between the lower end of the valve chamber 100 and the valve seat 102 so that when the ball valve 104 is in its lower or open position as shown in full lines in Fig. 9 the measuring chamber will communicate with the atmosphere through the passageway 78, valve chamber 100 and port 106 but when the ball valve 104 is in its closed (dotted line) position against the valve seat 102 the measuring chamber communicates only with the interior of the bottle.

The normal and rest positions of the parts are shown in Figs. 9 and 10 wherein the valve member 104 is in its open position and the sides 96 of the measuring chamber 68 are parallel. When it is desired to pour a measured quantity of liquor from the bottle, the bottle is raised to pouring position (compare Fig. 2), and liquor is poured from the spout 72 into a glass. When the bottle is thus tilted the ball valve 104 moves to its closed position against the seat 102. Any air, therefore, which displaces liquid poured from the bottle must come from the measuring chamber 68 and the partial vacuum created in the interior of the bottle is communicated to the measuring chamber 68 through the capillary tube 82 and passageway 78. Inasmuch as the rubber material from which the sack 94 is made is very thin, preferably being .002 inch, the sides 96 of the chamber will collapse approximately to the position shown in Fig. 11. When the sides 96 are fully collapsed the maximum amount of air will have been withdrawn from the measuring chamber and transferred to the bottle, and the flow of liquid from the interior of the bottle stops. As soon as the bottle is returned to its upright position the ball valve 104 drops to the bottom of the valve chamber 100 and the natural resiliency of the rubber sack 94 restores it to its original position (Fig. 10), air being sucked into the measuring chamber 68 through the port 106, valve chamber 100 and passageway 78.

While the valve chamber 100 is shown as mounted on the fitting 70 to communicate with the passageway 78, it can be mounted directly on the frame 86 so that the measuring chamber 68 would be vented directly through the valve chamber 100 rather than through the passageway 78 and the valve chamber. The measuring chamber 68 might be made so that the flexible side walls 96 are secured directly to the frame 86 rather than formed as a part of a balloon which encloses the frame and the outer end of the fitting 70. It would then be necessary to make the joint between the frame 86 and the fitting 70 airtight by soldering or brazing these parts together.

It will be seen from the foregoing description of this invention that all of the objects claimed for it at the outset of this specification are attained. It will be apparent to those skilled in the art that various changes and modifications might be made in the dispenser without departing from the spirit and scope of my invention. What I claim as new and useful and desire to secure by United States Letters Patent is:

1. A volumetric liquid dispenser comprising a liquid container having a pouring outlet, a closure member for said outlet, a pouring spout extending through said closure member and communicating with the interior of the container, a breather tube extending through said closure member and providing communication between the exterior and interior of the container, and flexible and liquid impervious means inelastic under the conditions of use forming an air measuring chamber which may vary its air content between predetermined maximum and minimum limits, the maximum limit being substantially less than the volume of said container and approximately the volumetric capacity of said measuring chamber when the walls thereof are in a collapsed condition, and means sealing said chamber to said breather tube on that end adapted to project into the container.

2. A volumetric liquid dispenser comprising a liquid container having a pouring outlet, a closure member for said outlet, a pouring spout extending through said closure member and communicating with the interior of the container, a breather tube extending through said closure member and providing communication between the exterior and interior of the container, and flexible means inelastic under the conditions of use forming an air measuring chamber communicating with the inner end of said breather tube and adapted to be positioned within the container and at least partially below the top level of the liquid therein, said air measuring chamber being adapted to vary its air content between pre-determined maximum and minimum limits, the maximum limit being substantially less than the volume of said container, and being not greater than the volumetric capacity of said chamber without stretching the walls thereof.

3. A volumetric liquid dispenser comprising a liquid container having a pouring outlet, a closure member for said outlet, a pouring spout extending through said closure member and communicating with the interior of the container, means forming a collapsible air measuring chamber inelastic under the conditions of use mounted within the container and supported by said closure member, and an air passage formed in and extending through said closure member and providing communication between the interior of said air chamber and the exterior of the container, the air content of said chamber being variable between pre-determined maximum and minimum limits, the maximum limit being substantially less than the volume of said container, and being not greater than the normal volumetric capacity of said chamber without stretching.

4. A volumetric liquid dispenser comprising a liquid container having a pouring outlet, a closure member for the outlet having a round boss located atop its partially curved outer surface, a pouring spout extending through said closure member and communicating with the interior of the container, a breather tube extending through said closure member and providing communication between the exterior and interior of the container, a decorative shell having a tubular flange at its upper end and adapted to be detachably mounted atop the said closure member and having an opening through which said pouring spout and said breather tube project, and flexible means inelastic under the conditions of use forming an air measuring chamber communicating with the inner end of said breather tube and located within the container, the air content of said measuring chamber being variable between pre-determined minimum and maximum limits, the maximum limit being substantially less than the volume of said container.

5. A volumetric liquid dispenser comprising a liquid container having a pouring outlet, a closure member for the outlet, a pouring spout extending through said closure member and communicating with the interior of the container, flexible inelastic means forming an air measuring chamber mounted within the container and supported by said closure member, said flexible means being pear-shaped with its larger end adapted to be located adjacent the bottom of the container, and an air passage formed in and extending through said closure member and connected to the smaller end of said air chamber to provide communication between the interior of said air chamber and the exterior of the container, the air content of said measuring chamber being variable between pre-determined minimum and maximum limits, the maximum limit being substantially less than the volume of said chamber.

6. A volumetric liquid dispenser comprising a liquid container having a pouring outlet, a closure member for the outlet, a pouring spout extending through said closure member in airtight relation therewith and communicating with the interior of the container, a breather tube extending through said closure member in airtight relation therewith and providing communication between the exterior and interior of the container, and flexible non-stretchable and air and liquid impervious means inelastic under conditions of use forming an air measuring chamber positioned within the container and sealed to said breather tube on that end adapted to project into the container, the air content of said measuring chamber being variable between pre-determined minimum and maximum limits, the maximum limit being substantially less than the volume of said chamber.

7. A volumetric liquid dispenser comprising a liquid container having a pouring outlet, a closure member for the outlet, a pouring spout extending through said closure member and communicating with the interior of the container, means forming a collapsible elongated inelastic pear-shaped measuring chamber the air content of which may be varied between pre-determined minimum and maximum limits, the maximum limit being substantially less than the volume of said container, said measuring chamber being located within the container, a breather tube extending through said closure member and projecting into said measuring chamber, means sealing the upper end of said measuring chamber to said tube, and a plurality of openings in said breather tube below said sealing means whereby constant air flow communication is provided between said measuring chamber and the atmosphere.

8. A device for measuring and volumetrically dispensing pre-determined amounts of liquid from a container comprising, in combination, a container having a pouring outlet, liquid passage means for the flow of liquid from said container including a pouring spout having dimensions inhibiting the simultaneous counter-flow of liquid and air, flexible means inelastic under the conditions of use within said container forming an air measuring chamber having pre-determined maximum and minimum air content limits, the maximum limit being substantially less than the volume of the container, air passage means connecting said chamber to atmosphere to vary its air content between said limits, means mounting air and liquid passage means on said container, and establishing communication between said outlet, said spout, said chamber, and the interior and exterior of said container, and whereby air is admitted into said chamber within said container simultaneously with the pouring of liquid therefrom and in substantially equal volume to that of the liquid dispensed, the pre-determined maximum air intake of said chamber being limited to the volumetrically pre-determined amount of liquid to be dispensed from said container in a single pouring operation.

9. A device for measuring and volumetrically dispensing pre-determined amounts of liquid from a container in a single pouring operation, comprising, in combination, a liquid container having a pouring outlet, a pouring spout, liquid passage means for the discharge of liquid from said container, flexible means inelastic under the conditions of use forming an air measuring chamber, having maximum and minimum air content limits, the maximum limit being substantially less than the volume of the container, and the minimum limit being substantially less than the maximum limit of said air measuring chamber, air passage means between the interior of said air chamber and the exterior of said container, means for closing the pouring outlet of said container and for mounting said liquid and air passage means thereon, and means for mounting said air measuring means within the container in such manner as to expel the air therefrom when the container is in non-pouring position.

10. A liquid dispenser of the volumetric type dispensing a pre-determined amount of liquid on each pouring operation and adapted to be used with a container having a pouring outlet, the volume of said container being substantially greater than the amount of liquid dispensed on each pouring operation, comprising in combination a pouring spout having dimensions inhibiting simultaneous counterflow of liqud and air, flexible means inelastic under the conditions of use forming an air measuring chamber having a pre-determined maximum and a minimum air content, the maximum content being substantially less than the volume of said container, and the minimum content of said chamber being substantially less than its own maximum, the said minimum content being determined by liquid weight and air compensating factors, air passage means connecting said air chamber to the exterior of said container to vary its air content toward one of said air content limits as the liquid content in the container is decreased by an amount substantially equal to the change in the air content in said chamber and to vary its air content toward the other of said air content limits simultaneously with the counterflow of air via said spout replenishing the maximum air content of the container as the container is placed in non-pouring position, and air and liquid passage means establishing communication between said spout, said air chamber, and the interior and the exterior of the said container, and means mounting said spout, said air chamber and said air passage means and adapted to be mounted at the pouring outlet of the container, whereby the amount of air admitted via the air chamber into the interior of the container simultaneously with the pouring operation is substantially equal to the simultaneous change which takes place between the said air content of the said chamber and the simultaneous change which takes place in the liquid content of said container and volumetrically determines the amount of liquid which may be dispensed from the container on each pouring operation.

11. A volumetric liquid dispenser for a liquid container having a pouring outlet, said dispenser adapted to be mounted within and upon said pouring outlet as a closure for said outlet, and comprising in combination, a closure member for the outlet, a pouring spout extending through said closure member and communicating with the interior of said container, a breather tube extending through said closure member, an elongated pear-shaped air measuring chamber, made of flexible but non-stretchable material and having an air content variable between pre-determined maximum and minimum limits, its maximum limit being substantially less than the volume of said container and the minimum limit approaching zero when the chamber is fully collapsed, said chamber having a pocket in its lower end adapted to receive that end of the breather tube adapted to project within the container and the upper end of said air chamber being sealed about said breather tube at a point intermediate its ends so that when said chamber is mounted on said tube it will be retained thereon tautly throughout its length so as to be substantially completely collapsed under atmospheric pressure, and a plurality of openings in said breather tube in the portion thereof enclosed within said air chamber, providing constant air flow communication between said air chamber and atmosphere.

12. A liquid dispenser for dispensing liquid in predetermined quantity from a bottle having a mouth; comprising a closure member for said mouth, a pouring spout extending through said closure member and communicating with the interior of the bottle, a breather tube extending through said closure member and providing communication between the exterior and the interior of the bottle and an inelastic collapsible bladder enclosing the end of said breather tube inside said bottle.

13. A liquid dispenser for dispensing liquid in predetermined quantities from a bottle having a mouth; comprising a closure member for said mouth, a pouring spout extending through said closure member and communicating with the interior of the bottle, a breather tube extending through said closure member and providing communication between the exterior and the interior of the bottle and a collapsible bladder formed of a material inelastic under the conditions of use enclosing the end of said breather tube inside said bottle.

14. A volumetric liquid dispenser for dispensing liquid in predetermined quantities from a bottle having a mouth; comprising a closure member for said mouth, a pouring spout extending through said closure member and communicating with the interior of the bottle, a breather tube extending through said closure member to a point adjacent the bottom of said bottle providing communication between the exterior and the interior of the bottle and a collapsible bladder formed of a material which is inelastic under the conditions of use enclosing the end of said breather tube within said bottle, said bladder being formed to have its greatest volume adjacent the bottom of said bottle, said enclosed end of said breather tube serving to maintain the lower end of said bladder adjacent the bottom of said bottle.

15. The combination as set forth in claim 14 wherein said breather tube is adjustable in said closure member to position said bladder adjacent the bottom of variably deep bottles.

16. A volumetric liquid dispenser for dispensing liquid in predetermined quantity from a bottle having a mouth; comprising a closure member for said mouth, a pouring spout extending through said closure member and communicating with the interior of the bottle, a breather tube extending through said closure member providing communication between the exterior and the interior of the bottle and a collapsible pear-shaped bladder, inelastic under the conditions of use, having its small end secured to said breather tube and the large end enclosing that end of said breather tube within said bottle, said breather tube being adjustable in said closure member to maintain the enlarged end of said bladder adjacent the bottom of variably deep bottles.

DWIGHT H. HESTER.

References Cited in the file of this patent

UNITED STATES PATENTS

| Number | Name | Date |
|---|---|---|
| 17,073 | Boyd | Apr. 21, 1857 |
| 534,541 | Wright et al. | Feb. 19, 1895 |
| 821,875 | Kneuper | May 29, 1906 |
| 878,389 | Henry | Feb. 4, 1908 |
| 941,905 | Bajon | Nov. 30, 1909 |

FOREIGN PATENTS

| Number | Country | Date |
|---|---|---|
| 558,874 | France | June 4, 1923 |